(12) United States Patent
Sung et al.

(10) Patent No.: US 11,908,382 B1
(45) Date of Patent: Feb. 20, 2024

(54) SEAMLESS SWITCHING CONTROL FOR FOLDABLE OR FLIP DEVICES

(71) Applicant: MediaTek Inc., Hsinchu (TW)

(72) Inventors: Chien-Chun Sung, Hsinchu (TW); Tai-Hua Tseng, Hsinchu (TW); KaiChieh Chuang, Hsinchu (TW); Hsin-Ju Chu, Hsinchu (TW)

(73) Assignee: MediaTek Inc., Taiwan (TW)

( * ) Notice: Subject to any disclaimer, the term of this patent is extended or adjusted under 35 U.S.C. 154(b) by 0 days.

(21) Appl. No.: 18/072,443

(22) Filed: Nov. 30, 2022

(51) Int. Cl.
*G09G 3/20* (2006.01)
*H04M 1/72448* (2021.01)

(52) U.S. Cl.
CPC ...... *G09G 3/2096* (2013.01); *H04M 1/72448* (2021.01); *G09G 2320/0247* (2013.01); *G09G 2330/021* (2013.01); *G09G 2330/026* (2013.01); *G09G 2330/027* (2013.01)

(58) Field of Classification Search
CPC ......... G09G 3/2096; G09G 2320/0247; G09G 2330/021; G09G 2330/026; G09G 2330/027; H04M 1/72448
USPC ....................................................... 345/212
See application file for complete search history.

(56) References Cited

U.S. PATENT DOCUMENTS

| | | | | |
|---|---|---|---|---|
| 2011/0006971 | A1* | 1/2011 | Ebey | G06F 3/1423 345/1.3 |
| 2013/0012273 | A1* | 1/2013 | Sato | G06F 1/1624 455/566 |
| 2016/0071485 | A1* | 3/2016 | Tripathi | G09G 5/36 345/589 |
| 2019/0295210 | A1* | 9/2019 | Pei | G09G 5/14 |
| 2021/0151045 | A1* | 5/2021 | Li | G06F 9/451 |
| 2021/0373833 | A1* | 12/2021 | Pawar | G09G 3/3406 |

* cited by examiner

*Primary Examiner* — Amare Mengistu
*Assistant Examiner* — Gloryvid Figueroa-Gibson
(74) *Attorney, Agent, or Firm* — Han IP PLLC; Andy M. Han

(57) ABSTRACT

Techniques pertaining to seamless switching control for foldable or flip devices are described. A processor implemented in a multi-display apparatus having a primary display and a secondary display executes a status change with respect to the primary display and the secondary display by: (1) maintaining a power supplied to the secondary display during the status change; and (2) switching the primary display and the secondary display from a first state to a second state.

24 Claims, 7 Drawing Sheets

SEAMLESS SWITCHING CONTROL FOR FOLDABLE OR FLIP DEVICES

TECHNICAL FIELD

The present disclosure is generally related to display control and, more particularly, to seamless switching control for foldable or flip devices.

BACKGROUND

Unless otherwise indicated herein, approaches described in this section are not prior art to the claims listed below and are not admitted as prior art by inclusion in this section.

One of the rising trends on the consumer market is the increasing popularity of portable devices with multiple displays. In the context of a foldable or flip smartphone, for example, there may be a primary display and a secondary display each configured to display different contents or the same content with different resolutions or the same resolution. The primary display may be on a front or primary side of the smartphone facing the user during normal usage of the smartphone (e.g., when the foldable smartphone is folded or flipped open). On the other hand, the secondary display may be on a back or secondary side of the smartphone and may be used by the user to view content when the foldable smartphone is folded or flipped closed. Depending on the operating system (OS) and features of the smartphone, each of the primary display and secondary display may be turned on and off according to the status of the smartphone (e.g., folded open or folded closed) and/or applications executed at the time. However, when the status of the primary display and secondary display is changed from one state to another, there may be situations in which there is a period of time the secondary display is turned off (and shows a black screen) even through the secondary display is supposed to be on before the status change as well as after the status change. This tends to result in a visibly discernible flash of the secondary display, thereby negatively impacting user experience. Therefore, there is a need for a solution of seamless switching control for foldable or flip devices.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to seamless switching control for foldable or flip devices. Under various proposed schemes in accordance with the present disclosure, it is believed that various schemes proposed herein may address or otherwise alleviate aforementioned challenges and issues.

In one aspect, a method may involve a processor implemented in a multi-display apparatus having a primary display and a secondary display executing a status change with respect to the primary display and the secondary display by: (1) maintaining a power supplied to the secondary display during the status change; and (2) switching the primary display and the secondary display from a first state to a second state.

In another aspect, a device implementable in a multi-display apparatus having a primary display and a secondary display may include a processor. The processor may be configured to execute a status change with respect to the primary display and the secondary display by: (1) maintaining a power supplied to the secondary display during the status change; and (2) switching the primary display and the secondary display from a first state to a second state.

It is noteworthy that, although description provided herein may be in the context of foldable or flip devices such as, foldable or flip smartphones, the proposed concepts, schemes and any variation(s)/derivative(s) thereof may be implemented in, for and by other types of devices and apparatuses such as, for example and without limitation, wearable devices, smart devices, personal digital assistants, computing devices, Internet-of-Things (IoT) devices and the like. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to seamless switching control for foldable or flip devices. According to the present disclosure, a number of possible solutions may be implemented separately or jointly. That is, although these possible solutions may be described below separately, two or more of these possible solutions may be implemented in one combination or another.

Figure 1:
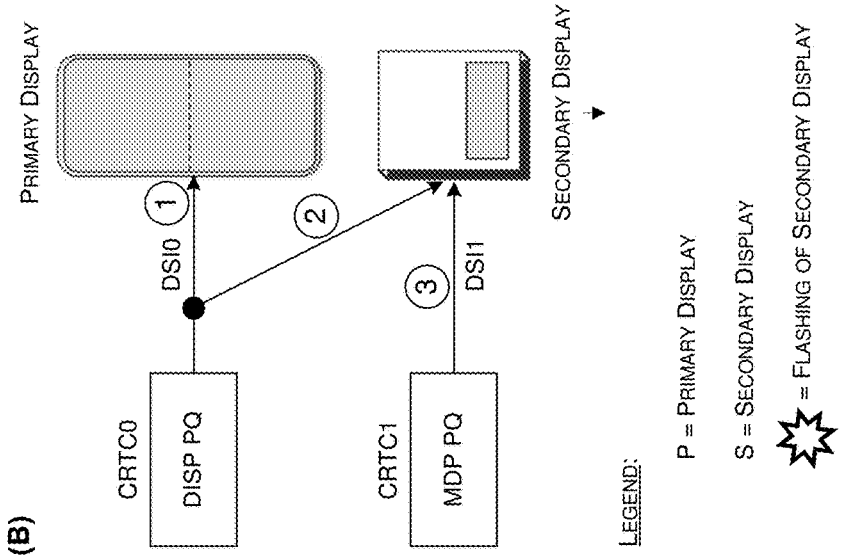
FIG. 1 is a diagram of an overview of operations of an example multi-display apparatus in which various solutions and schemes in accordance with the present disclosure may be implemented.

FIG. 1 illustrates an overview 100 of operations of an example multi-display apparatus in which various solutions and schemes in accordance with the present disclosure may be implemented. Part (A) of FIG. 1 shows a table listing various status change operations to change the multi-display apparatus from a first state (or original state) to a second state (or target state). Part (B) of FIG. 1 shows relevant elements of the multi-display device including a primary display (denoted as "P" in FIG. 1 as well as FIG. 2~FIG. 5), a secondary display (denoted as "S" in FIG. 1 as well as FIG. 2~FIG. 5), a first controller virtual pipe (herein interchangeably referred to as "first virtual pipe" and denoted as "CRTC0" in FIG. 1), a second controller virtual pipe (herein interchangeably referred to as "second virtual pipe" and denoted as "CRTC1" in FIG. 1), a first display serial interface (denoted as "DSI0" in FIG. 1) and a second display serial interface (denoted as "DSI1" in FIG. 1). Each of the first virtual pipe and the second virtual pipe may include respective hardware components configured to provide functionalities of display processing (denoted as "DPU0" and "DPU1" in FIG. 2~FIG. 5), overlaying (denoted as "OVL0" and "OVL1" in FIG. 2~FIG. 5), and picture quality enhancement (denoted as "PQ0" and "PQ1" in FIG. 2~FIG. 5). The primary display may have a larger display area, a higher display resolution, or both, compared to the secondary display. In a DSI switch design, CRTC0 may be switched to connect to either DSI0 to light up and display content on the primary display or to DSI1 to light up and display content on the secondary display, while CRTC1 may be connected to the secondary display. In an N-channel design (with N>1), CRTC0 may be connected to DSI0 to light up and display content on the primary display while CRTC1 may be connected to DSI1 to light up and display content on the secondary display. The various status change operations listed in the table shown in part (A) of FIG. 1 are described below.

In a first status-change scenario, neither the primary display nor the secondary display is turned on or otherwise lit in the original state, and only the primary display is turned on and lit in the target state. Pertinent power sequence to effect this status change involves turning on the primary display via a first path (denoted as "(1)" in FIG. 1) from CRTC0 through DSI0.

In a second status-change scenario, neither the primary display nor the secondary display is turned on or otherwise lit in the original state, and only the secondary display is turned on and lit in the target state. Pertinent power sequence to effect this status change involves turning on the secondary display via a second path (denoted as "(2)" in FIG. 1) from CRTC0 through DSI1.

In a third status-change scenario, neither the primary display nor the secondary display is turned on or otherwise lit in the original state, and both the primary and secondary display are turned on and lit in the target state. Pertinent power sequence to effect this status change involves turning on the primary display via the first path and turning on the secondary display via a third path (denoted as "(3)" in FIG. 1) from CRTC1 through DSI1.

In a fourth status-change scenario, only the primary display is turned on and lit in the original state, and neither the primary display nor the secondary display is turned on or otherwise lit in the target state. Pertinent power sequence to effect this status change involves turning off the primary display via the first path.

In a fifth status-change scenario, only the primary display is turned on and lit in the original state, and both the primary display and secondary display are turned on and lit in the target state. Pertinent power sequence to effect this status change involves turning on the secondary display via the third path.

In a sixth status-change scenario, only the primary display is turned on and lit in the original state, and only the secondary display is turned on and lit in the target state. Pertinent power sequence to effect this status change involves turning off the primary display via the first path and turning on the secondary display via the second path.

In a seventh status-change scenario, only the secondary display is turned on and lit in the original state, and neither the primary display nor the secondary display is turned on or otherwise lit in the target state. Pertinent power sequence to effect this status change involves turning off the secondary display via the second path.

In an eighth status-change scenario, only the secondary display is turned on and lit in the original state, and both the primary display and secondary display are turned on and lit in the target state. Pertinent power sequence to effect this status change involves turning off the secondary display via the second path, turning on the primary display via the first path, and then turning on the second display via the third path. As can be seen, although the secondary display is on and lit in both the original state and target state, turning off the secondary display during the status change undesirably results in a black screen being displayed by the secondary display, thereby causing a visibly discernible flash of the secondary display (e.g., due to the secondary display being off for a panel initial latency of approximately 200 milliseconds (ms)).

In a ninth status-change scenario, only the secondary display is turned on and lit in the original state, and only the primary display is turned on and lit in the target state. Pertinent power sequence to effect this status change involves turning off the secondary display via the second path and turning on the primary display via the first path.

In a tenth status-change scenario, both the primary display and secondary display are turned on and lit in the original state, and neither the primary display nor the secondary display is turned on or otherwise lit in the target state. Pertinent power sequence to effect this status change involves turning off the secondary display via the third path and turning off the primary display via the first path.

In an eleventh status-change scenario, both the primary display and secondary display are turned on and lit in the original state, and only the primary display is turned on and lit in the target state. Pertinent power sequence to effect this status change involves turning off the secondary display via the third path.

In a twelfth status-change scenario, both the primary display and secondary display are turned on and lit in the original state, and only the secondary display is turned on and lit in the target state. Pertinent power sequence to effect this status change involves turning off the primary display via the first path, turning off the secondary display via the third path, and then turning on the secondary display via the second path. As can be seen, although the secondary display is on and lit in both the original state and target state, turning off the secondary display during the status change undesirably results in a black screen being displayed by the secondary display, thereby causing a visibly discernible flash of the secondary display (e.g., due to the secondary display being off for a panel initial latency of approximately 200 ms).

Under a proposed scheme in accordance with the present disclosure, in order to achieve seamless switching control to avoid aforementioned "flashing" or "black screen" phenomenon, switching from a first state (e.g., original state) to a second state (e.g., target state) to effect status change with respect to a multi-display apparatus may involve maintaining a power supplied to the secondary display. For instance, the multi-display apparatus may detect an occurrence of status change with respect to its primary display and secondary display based on a user action (e.g., by flipping open or closed the multi-display apparatus to use either the primary display or the secondary display as the screen used to view certain content(s)) and/or an OS command such as, for example and without limitation, an Android Open Source Project (AOSP) command from an Android OS executed on the multi-display apparatus.

Under the proposed scheme, despite a state change process to change from the first state to the second state according to a command from an OS may entail cutting off the power supplied to the secondary display, discontinuing or changing of the power supplied to the secondary display may be refrained or otherwise not carried out according to the command (e.g., an AOSP command from the Android OS). Additionally, under the proposed scheme, a backup pipe as a backup of either of the first virtual pipe and second virtual pipe may be prepared to effect the switch from the first state to the second state.

Figure 2:
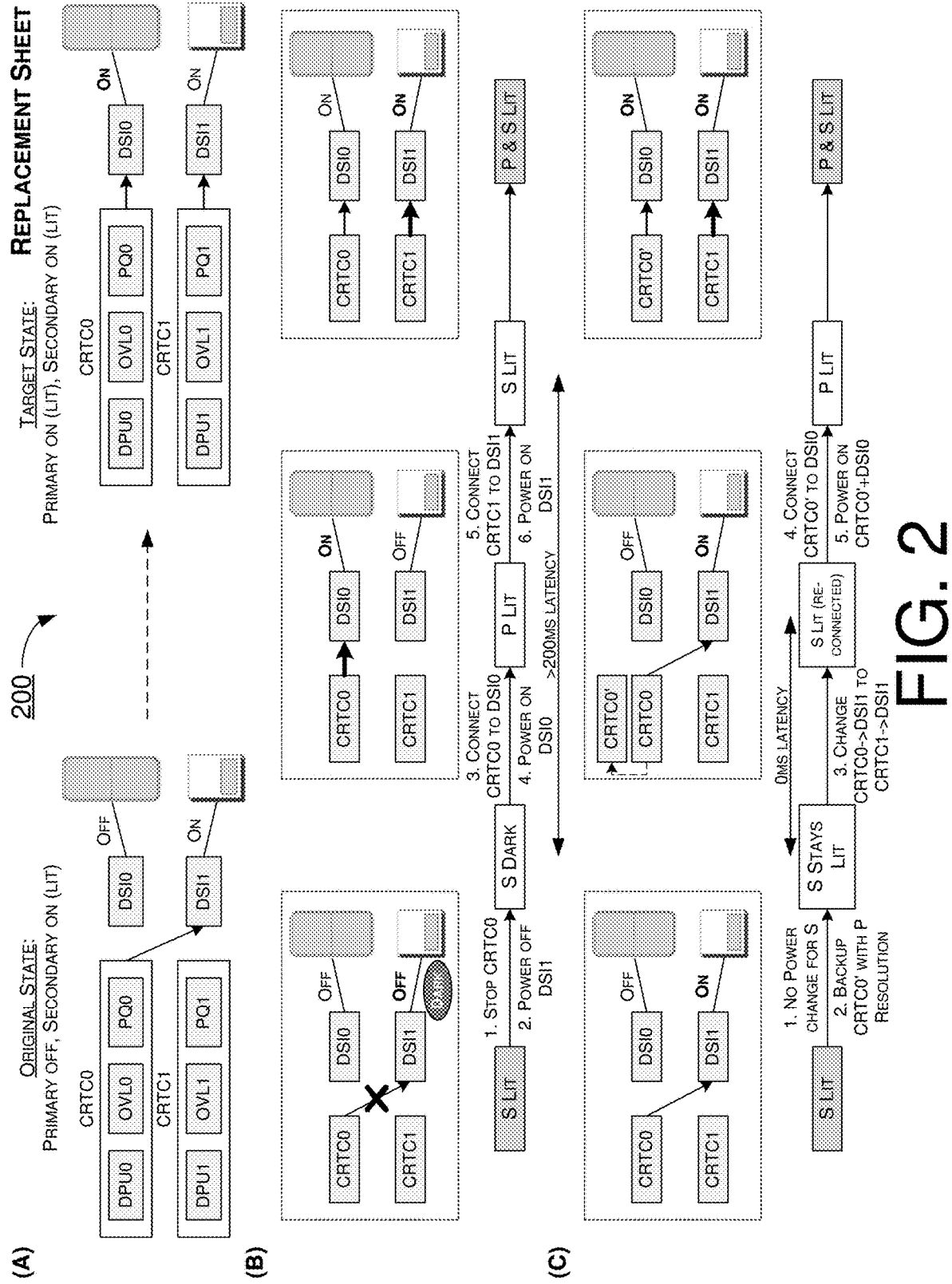
FIG. 2 is a diagram of an example scenario under a proposed scheme in accordance with the present disclosure.

FIG. 2 illustrates an example scenario 200 under a proposed scheme in accordance with the present disclosure. Scenario 200 may pertain to a single-to-multiple status change under a DSI switch design in that, the multi-display apparatus is to change from having only the secondary display turned on to having both the primary display and secondary display turned on. Part (A) of FIG. 2 shows the status of the multi-display apparatus in an original state (or first state) and a target state (or second state), respectively. In the original state, the primary display is off and the secondary display is on. In the target state, both the primary display and secondary display are on.

Part (B) of FIG. 2 shows an example power sequence that would typically take place to effect the status change. For instance, in a first step, CRTC0 may be stopped. In a second step, DSI1 may be powered off. In a third step, CRTC0 may be connected to DSI0. In a fourth step, DSI0 may be powered on. In a fifth step, CRTC1 may be connected to DSI1. In a sixth step, DSI1 may be powered on. As a result of at least 200 ms of latency between DSI1 being powered off and then back on, the undesirable "flashing" or "black screen" phenomenon would occur.

Part (C) of FIG. 2 shows an example power sequence under a proposed scheme in accordance with the present disclosure. Referring to part (C) of FIG. 2, in switching the primary display and the secondary display from the first state to the second state, the multi-display apparatus may prepare a backup pipe as a backup of a first virtual pipe (e.g., CRTC0) with a resolution of the primary display. Additionally, the multi-display apparatus may change from the first virtual pipe being connected to a second DSI (e.g., DSI1) corresponding to the secondary display to a second virtual pipe (e.g., CRTC1) being connected to the second DSI. Also, the multi-display apparatus may connect the backup pipe to a first DSI (e.g., DSI0) corresponding to the primary display. Moreover, the multi-display apparatus may connect the second virtual pipe to the second DSI. Furthermore, the multi-display apparatus may power on the backup pipe and the first DSI to turn on the primary display. Accordingly, 0ms latency (or no latency) between DSI1 being powered off and then back on would result, which is desirable.

Figure 3:
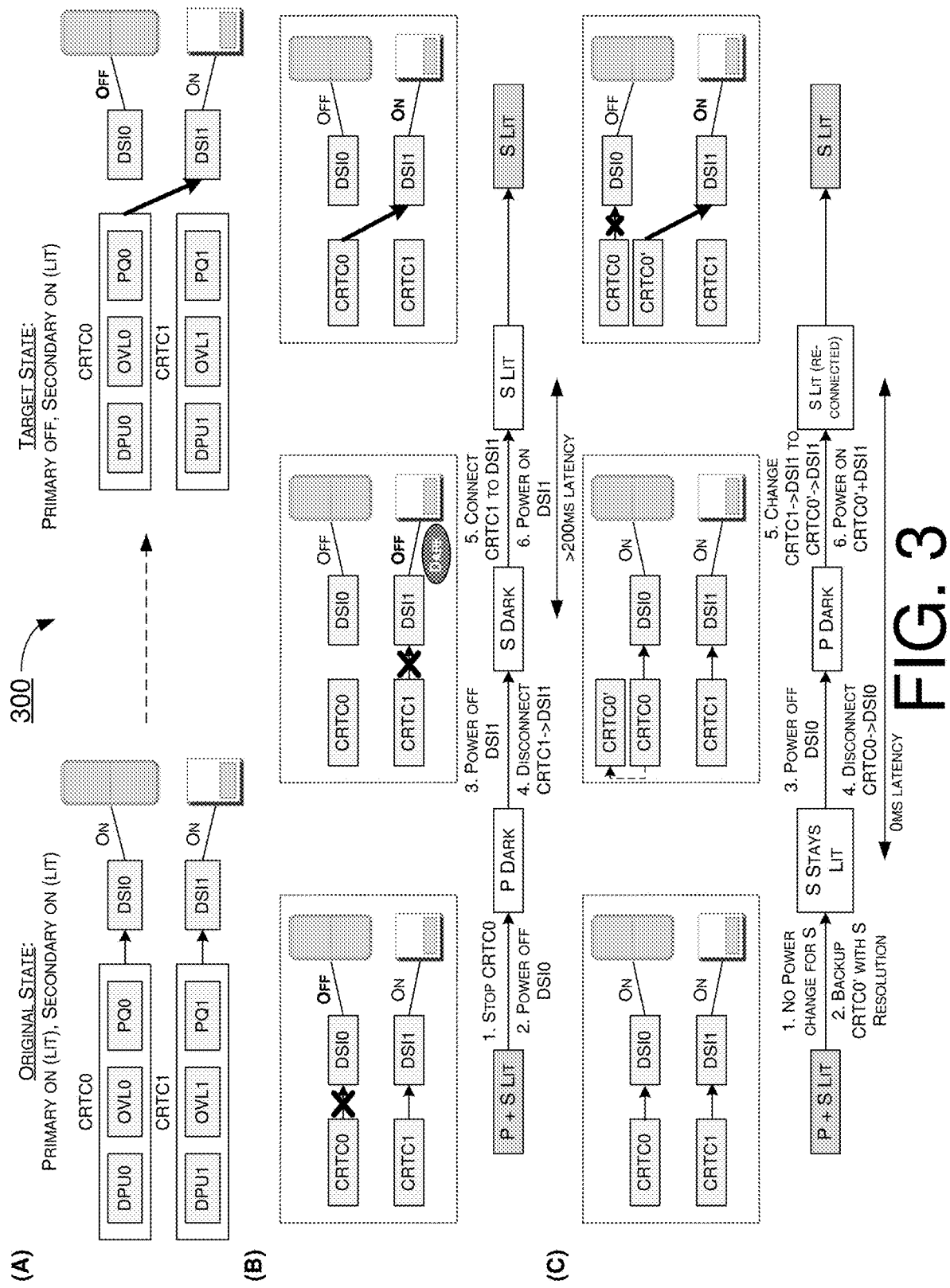
FIG. 3 is a diagram of an example scenario under a proposed scheme in accordance with the present disclosure.

FIG. 3 illustrates an example scenario 300 under a proposed scheme in accordance with the present disclosure. Scenario 300 may pertain to a multiple-to-single status change under a DSI switch design in that, the multi-display apparatus is to change from having both the primary display and secondary display turned on to having only the secondary display turned on. Part (A) of FIG. 3 shows the status of the multi-display apparatus in an original state (or first state) and a target state (or second state), respectively. In the original state, both the primary display and secondary display are on. In the target state, the primary display is off and the secondary display is on.

Part (B) of FIG. 3 shows an example power sequence that would typically take place to effect the status change. For instance, in a first step, CRTC0 may be stopped. In a second step, DSI0 may be powered off. In a third step, DSI1 may be powered off. In a fourth step, CRTC1 may be disconnected from DSI1. In a fifth step, CRTC1 may be connected to DSI1. In a sixth step, DSI1 may be powered on. As a result of at least 200 ms of latency between DSI1 being powered off and then back on, the undesirable "flashing" or "black screen" phenomenon would occur.

Part (C) of FIG. 3 shows an example power sequence under a proposed scheme in accordance with the present disclosure. Referring to part (C) of FIG. 3, in switching the primary display and the secondary display from the first state to the second state, the multi-display apparatus may prepare a backup pipe as a backup of a first virtual pipe (e.g., CRTC0) with a resolution of the secondary display. Additionally, the multi-display apparatus may power off a first DSI (e.g., DSI0) corresponding to the primary display to turn off the primary display. Moreover, the multi-display apparatus may disconnect the first virtual pipe from the first DSI. Also, the multi-display apparatus may change from a second virtual pipe (e.g., CRTC1) being connected to a second DSI (e.g., DSI1) corresponding to the secondary display to the backup pipe being connected to the second DSI. Furthermore, the multi-display apparatus may power on the backup pipe and the second DSI for the secondary display. Accordingly, 0ms latency (or no latency) between DSI1 being powered off and then back on would result, which is desirable.

Figure 4:
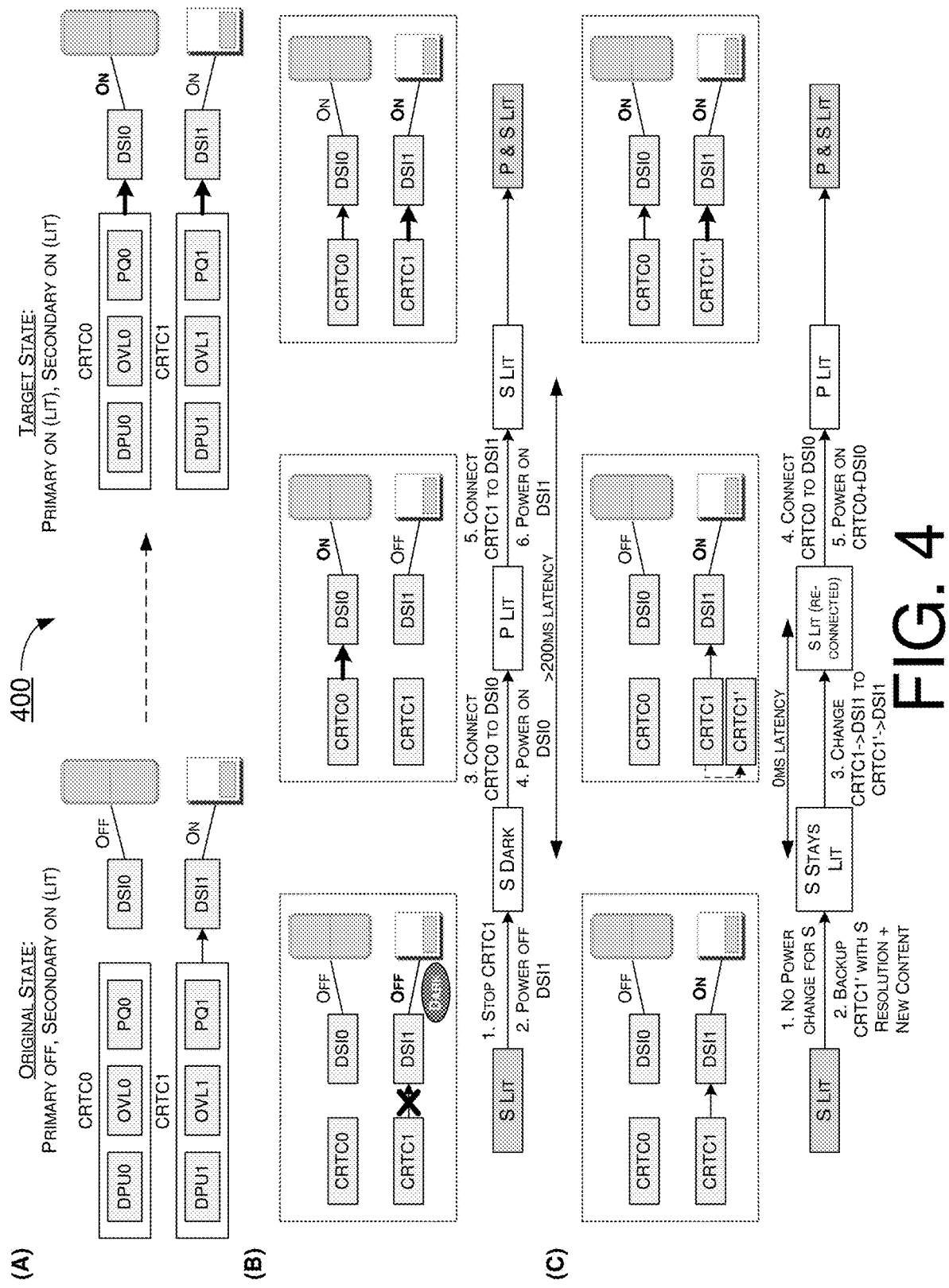
FIG. 4 is a diagram of an example scenario under a proposed scheme in accordance with the present disclosure.

FIG. 4 illustrates an example scenario 400 under a proposed scheme in accordance with the present disclosure. Scenario 400 may pertain to a single-to-multiple status change under an N-channel design in that, the multi-display apparatus is to change from having only the secondary display turned on to having both the primary display and secondary display turned on. Part (A) of FIG. 4 shows the status of the multi-display apparatus in an original state (or first state) and a target state (or second state), respectively. In the original state, the primary display is off and the secondary display is on. In the target state, both the primary display and secondary display are on.

Part (B) of FIG. 4 shows an example power sequence that would typically take place to effect the status change. For instance, in a first step, CRTC1 may be stopped. In a second step, DSI1 may be powered off. In a third step, CRTC0 may be connected to DSI0. In a fourth step, DSI0 may be powered on. In a fifth step, CRTC1 may be connected to DSI1. In a sixth step, DSI1 may be powered on. As a result of at least 200 ms of latency between DSI1 being powered off and then back on, the undesirable "flashing" or "black screen" phenomenon would occur.

Part (C) of FIG. 4 shows an example power sequence under a proposed scheme in accordance with the present disclosure. Referring to part (C) of FIG. 4, in switching the primary display and the secondary display from the first state to the second state, the multi-display apparatus may prepare a backup pipe as a backup of the second virtual pipe with a resolution of the secondary display and a new content. Additionally, the multi-display apparatus may change from a second virtual pipe (e.g., CRTC1) being connected to a second DSI (e.g., DSI} corresponding to the secondary display to the backup pipe being connected to the second DSI. Moreover, the multi-display apparatus may connect a first virtual pipe (e.g., CRTC0) to a first DSI (e.g., DSI0) corresponding to the primary display. Furthermore, the multi-display apparatus may connect the backup pipe to the second DSI. Also, the multi-display apparatus may power on the first virtual pipe and the first DSI to turn on the primary display. Accordingly, 0ms latency (or no latency} between DSI1 being powered off and then back on would result, which is desirable.

Figure 5:
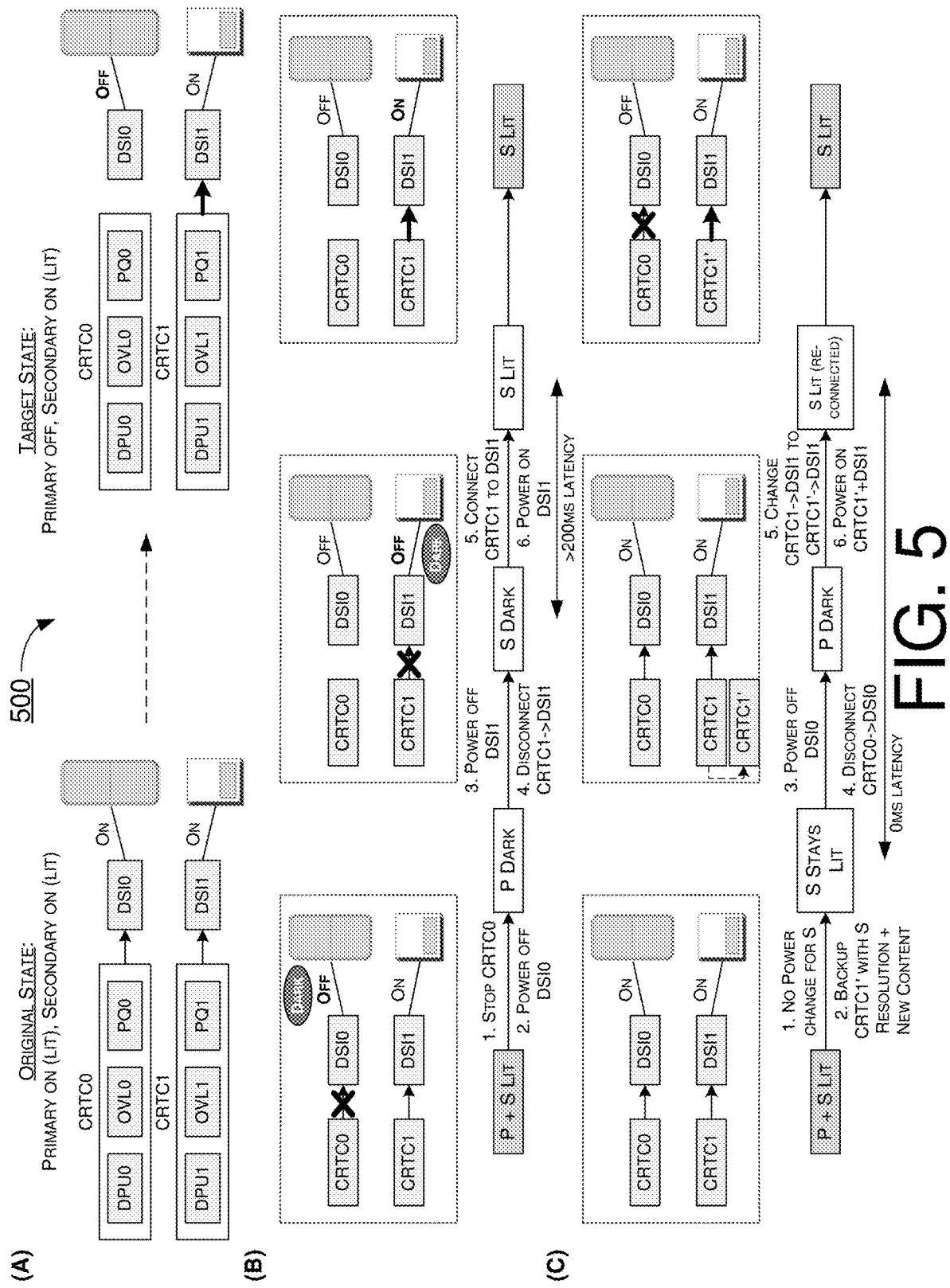
FIG. 5 is a diagram of an example scenario under a proposed scheme in accordance with the present disclosure.

FIG. 5 illustrates an example scenario 500 under a proposed scheme in accordance with the present disclosure. Scenario 500 may pertain to a multiple-to-single status change under an N-channel design in that, the multi-display apparatus is to change from having both the primary display and secondary display turned on to having only the secondary display turned on. Part (A) of FIG. 5 shows the status of the multi-display apparatus in an original state (or first state) and a target state (or second state), respectively. In the original state, both the primary display and secondary display are on. In the target state, the primary display is off and the secondary display is on.

Part (B) of FIG. 5 shows an example power sequence that would typically take place to effect the status change. For instance, in a first step, CRTC0 may be stopped. In a second step, DSI0 may be powered off. In a third step, DSI1 may be powered off. In a fourth step, CRTC1 may be disconnected from DSI1. In a fifth step, CRTC1 may be connected to DSI1. In a sixth step, DSI1 may be powered on. As a result of at least 200 ms of latency between DSI1 being powered off and then back on, the undesirable "flashing" or "black screen" phenomenon would occur.

Part (C) of FIG. 5 shows an example power sequence under a proposed scheme in accordance with the present disclosure. Referring to part (C) of FIG. 5, in switching the primary display and the secondary display from the first state to the second state, the multi-display apparatus may prepare a backup pipe as a backup of a second virtual pipe (e.g. CRTC1) with a resolution of the secondary display and a new content. Also, the multi-display apparatus may power off a first DSI (e.g., DSI0) corresponding to the primary display to turn off the primary display. Additionally, the multi-display apparatus may disconnect a first virtual pipe (e.g., CRTC0) from the first DSI. Moreover, the multi-display apparatus may change from the second virtual pipe being connected to a second DSI (e.g., DSI1) corresponding to the secondary display to the backup pipe being connected to the second DSI. Furthermore, the multi-display apparatus may power on the backup pipe and the second DSI for the secondary display. Accordingly, 0ms latency (or no latency) between DSI1 being powered off and then back on would result, which is desirable.

Illustrative Implementations

Figure 6:
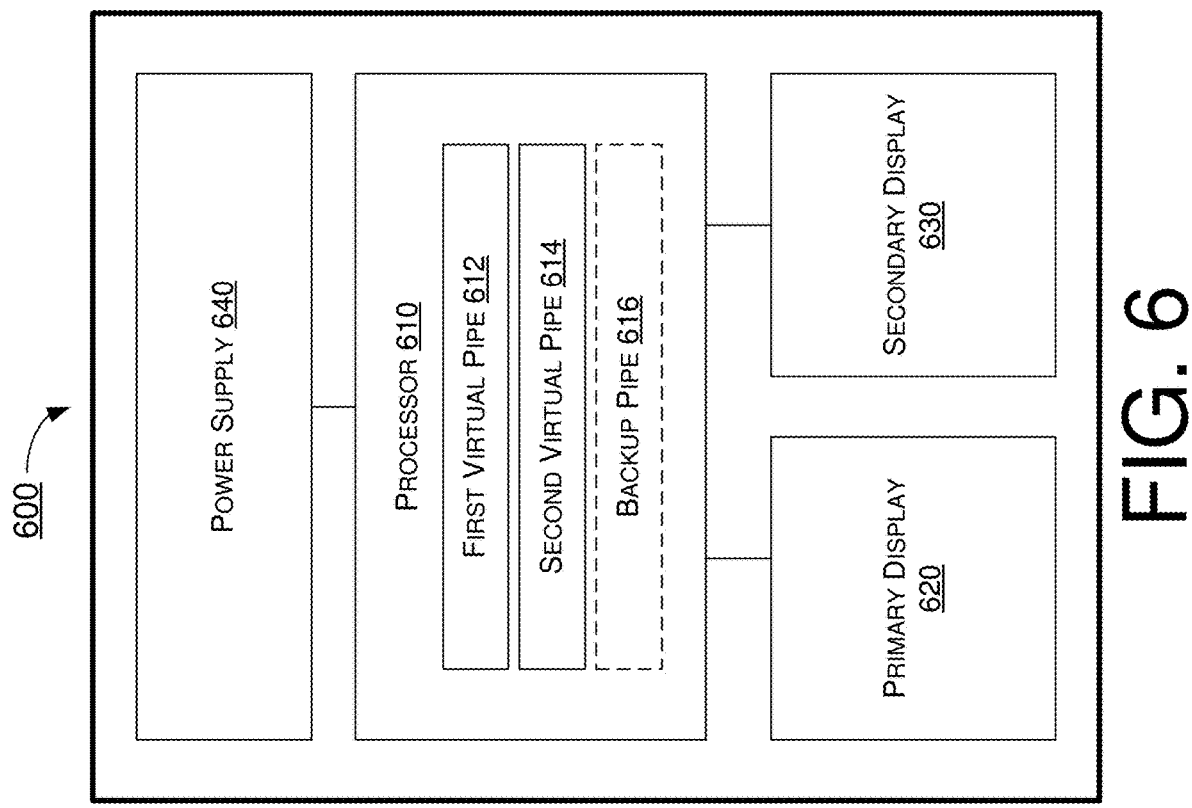
FIG. 6 is a block diagram of an example apparatus in accordance with an implementation of the present disclosure.

FIG. 6 illustrates an example apparatus 600 in accordance with an implementation of the present disclosure. Apparatus 600 may perform various functions to implement schemes, techniques, processes and methods described herein pertaining to seamless switching control for foldable or flip devices, including the various schemes described above with respect to various proposed designs, concepts, schemes, systems and methods described above as well as processes described below. Moreover, apparatus 600 may be implemented in or as a multi-display apparatus such as, for example and without limitation, a portable or mobile apparatus, a wearable apparatus, a wireless communication apparatus or a computing apparatus. For instance, apparatus 600 may be implemented in a smartphone, a smart watch, a personal digital assistant, a digital camera, or a computing equipment such as a tablet computer, a laptop computer or a notebook computer.

In some implementations, apparatus 600 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 600 may include at least some of those components shown in FIG. 6 such as a processor 610, for example. Apparatus 600 may further include one or more other components not pertinent to the proposed scheme of the present disclosure (e.g., memory device and/or transceiver), and, thus, such component(s) of apparatus 600 are neither shown in FIG. 6 nor described below in the interest of simplicity and brevity.

In one aspect, processor 610 may be implemented in the form of one or more single-core processors, one or more multi-core processors, one or more RISC processors or one or more CISC processors. That is, even though a singular term "a processor" is used herein to refer to processor 610, processor 610 may include multiple processors in some implementations and a single processor in other implementations in accordance with the present disclosure. In another aspect, processor 610 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 610 is a special-purpose machine specifically designed, arranged and configured to perform specific tasks including those pertaining to seamless switching control for foldable or flip devices in accordance with various implementations of the present disclosure. For instance, when apparatus 600 is implemented in or as a multi-display apparatus, processor 610 may include certain hardware components (e.g., circuits) configured to perform various functions described above with respect to FIG. 1~FIG. 5. As shown in FIG. 6, processor 610 may include a first virtual pipe 612, a second virtual pipe 614 and, optionally, a backup pipe 616, each of which including respective hardware components (e.g., electronic circuit(s)) configured to provide display processing, overlaying, and picture quality enhancement functionalities. Alternatively, or additionally, software, firmware and/or middleware may be executed by processor 610 to perform some or all of the functions described above with respect to FIG. 1~FIG. 5.

In some implementations, apparatus 600 may also include a primary display 620 and a secondary display 630 that are coupled to processor 610. In some implementations, primary display 620 may have a larger display area, a higher display resolution, or both, compared to secondary display 630.

In some implementations, apparatus 600 may further include a power supply 640. For instance, power supply 640 may be an internal battery configured to supply power (e.g., direct-current (DC) power), as controlled by processor 610, to turn on (and thereby light up) each of primary display 620 and secondary display 630. Alternatively, or additionally, power supply 640 may include power management circuitry and/or transformer. Alternatively, or additionally, power supply 640 may be configured to receive and convert an alternating-current (AC) power (e.g., from AC mains) to convert to DC power and, as controlled by processor 610, to turn on and light up each of primary display 620 and secondary display 630.

Under various proposed schemes in accordance with the present disclosure pertaining to seamless switching control for foldable or flip devices, with apparatus 610 implemented in or as a multi-display apparatus, processor 610 of apparatus 600 may maintain a power supplied to secondary display 630 during the status change. Moreover, processor 610 may switch primary display 620 and secondary display 630 from a first state to a second state.

In some implementations, in the first state, primary display 620 may be off and secondary display 630 may be on, while, in the second state, both primary display 620 and secondary display 630 may be on. This may correspond to the eighth status-change scenario listed in the table of part (A) of FIG. 1.

In some implementations, in switching primary display 620 and secondary display 630 from the first state to the second state, processor 610 may perform certain operations in a DSI switch design. For instance, processor 610 may prepare a backup pipe as a backup of a first virtual pipe (e.g., CRTC0) with a resolution of primary display 620. Additionally, processor 610 may change from the first virtual pipe being connected to a second DSI (e.g., DSI1) corresponding to secondary display 630 to a second virtual pipe (e.g., CRTC1) being connected to the second DSI. Also, processor 610 may connect the backup pipe to a first DSI (e.g., DSI0) corresponding to primary display 620. Moreover, processor 610 may connect the second virtual pipe to the second DSI. Furthermore, processor 610 may power on the backup pipe and the first DSI to turn on primary display 620.

In some implementations, in switching primary display 620 and secondary display 630 from the first state to the second state, processor 610 may perform certain operations in an N-channel design. For instance, processor 610 may prepare a backup pipe as a backup of the second virtual pipe with a resolution of secondary display 630 and a new content. Additionally, processor 610 may change from a second virtual pipe (e.g., CRTC1) being connected to a second DSI (e.g., DSI1) corresponding to secondary display 630 to the backup pipe being connected to the second DSI. Moreover, processor 610 may connect a first virtual pipe (e.g., CRTC0) to a first DSI (e.g., DSI0) corresponding to primary display 620. Furthermore, processor 610 may connect the second virtual pipe to the second DSI. Also, processor 610 may power on the backup pipe and the first DSI to turn on primary display 620.

In some implementations, in the first state, both primary display 620 and secondary display 630 may be on, while, in the second state, primary display 620 may be off and secondary display 630 may be on. This may correspond to the twelfth status-change scenario listed in the table of part (A) of FIG. 1.

In some implementations, in switching primary display 620 and secondary display 630 from the first state to the second state, processor 610 may perform certain operations in a DSI switch design. For instance, processor 610 may prepare a backup pipe as a backup of a first virtual pipe (e.g., CRTC0) with a resolution of secondary display 630. Additionally, processor 610 may power off a first DSI (e.g., DSI0) corresponding to primary display 620 to turn off primary display 620. Moreover, processor 610 may disconnect the first virtual pipe from the first DSI. Also, processor 610 may change from a second virtual pipe (e.g., CRTC1) being connected to a second DSI (e.g., DSI1) corresponding to secondary display 630 to the backup pipe being connected to the second DSI. Furthermore, processor 610 may power on the backup pipe and the second DSI for secondary display 630.

In some implementations, in switching primary display 620 and secondary display 630 from the first state to the second state, processor 610 may perform certain operations in an N-channel design. For instance, processor 610 may prepare a backup pipe as a backup of a second virtual pipe (e.g., CRTC1) with a resolution of secondary display 630 and a new content. Also, processor 610 may power off a first DSI (e.g., DSI0) corresponding to primary display 620 to turn off primary display 620. Additionally, processor 610 may disconnect a first virtual pipe (e.g., CRTC0) from the first DSI. Moreover, processor 610 may change from the second virtual pipe being connected to a second DSI (e.g., DSI1) corresponding to secondary display 630 to the backup pipe being connected to the second DSI. Furthermore, processor 610 may power on the backup pipe and the second DSI for secondary display 630.

In some implementations, in maintaining the power supplied to secondary display 630, processor 610 may refrain from discontinuing or changing the power supplied to secondary display 630 despite a state change process to change from the first state to the second state according to a command from an OS involves cutting off the power supplied to secondary display 630. In some implementations, the command may include an AOSP command.

Illustrative Processes

Figure 7:
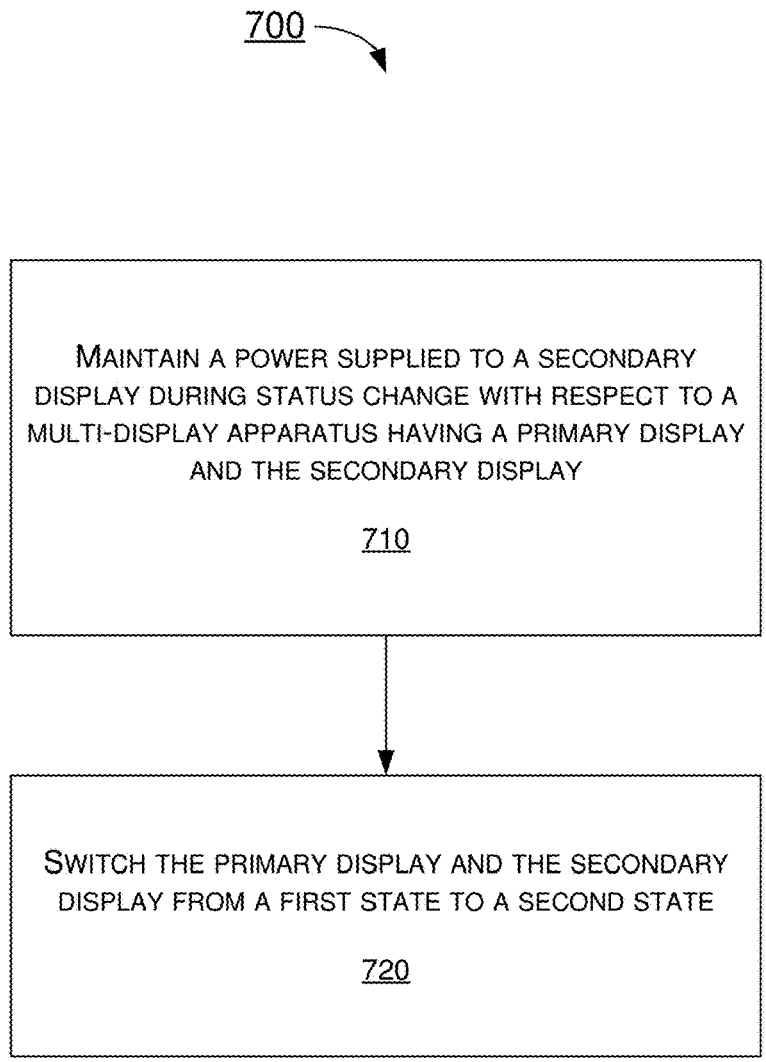
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to seamless switching control for foldable or flip devices in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 600 as well as any variations thereof. Solely for illustrative purposes and without limiting the scope, process 700 is described below in the context of apparatus 600 implemented in or as a multi-display apparatus such as a smartphone, for example. Process 700 may begin at block 710.

At 710, process 700 may involve processor 610 of apparatus 600 maintaining a power supplied to secondary display 630 during the status change. Process 700 may proceed from 710 to 720.

At 720, process 700 may involve processor 610 switching primary display 620 and secondary display 630 from a first state to a second state.

In some implementations, in the first state, primary display 620 may be off and secondary display 630 may be on, while, in the second state, both primary display 620 and secondary display 630 may be on. This may correspond to the eighth status-change scenario listed in the table of part (A) of FIG. 1.

In some implementations, in switching primary display 620 and secondary display 630 from the first state to the second state, process 700 may involve processor 610 performing certain operations in a DSI switch design. For instance, process 700 may involve processor 610 preparing a backup pipe as a backup of a first virtual pipe (e.g., CRTC0) with a resolution of primary display 620. Additionally, process 700 may involve processor 610 changing from the first virtual pipe being connected to a second DSI (e.g., DSI1) corresponding to secondary display 630 to a second virtual pipe (e.g., CRTC1) being connected to the second DSI. Also, process 700 may involve processor 610 connecting the backup pipe to a first DSI (e.g., DSI0) corresponding to primary display 620. Moreover, process 700 may involve processor 610 connecting the second virtual pipe to the second DSI. Furthermore, process 700 may involve processor 610 powering on the backup pipe and the first DSI to turn on primary display 620.

In some implementations, in switching primary display 620 and secondary display 630 from the first state to the second state, process 700 may involve processor 610 performing certain operations in an N-channel design. For instance, process 700 may involve processor 610 preparing a backup pipe as a backup of the second virtual pipe with a resolution of secondary display 630 and a new content. Additionally, process 700 may involve processor 610 changing from a second virtual pipe (e.g., CRTC1) being connected to a second DSI (e.g., DSI1) corresponding to secondary display 630 to the backup pipe being connected to the second DSI. Moreover, process 700 may involve processor 610 connecting a first virtual pipe (e.g., CRTC0) to a first DSI (e.g., DSI0) corresponding to primary display 620. Furthermore, process 700 may involve processor 610 connecting the second virtual pipe to the second DSI. Also, process 700 may involve processor 610 powering on the backup pipe and the first DSI to turn on primary display 620.

In some implementations, in the first state, both primary display 620 and secondary display 630 may be on, while, in the second state, primary display 620 may be off and secondary display 630 may be on. This may correspond to the twelfth status-change scenario listed in the table of part (A) of FIG. 1.

In some implementations, in switching primary display 620 and secondary display 630 from the first state to the second state, process 700 may involve processor 610 performing certain operations in a DSI switch design. For instance, process 700 may involve processor 610 preparing a backup pipe as a backup of a first virtual pipe (e.g., CRTC0) with a resolution of secondary display 630. Additionally, process 700 may involve processor 610 powering off a first DSI (e.g., DSI0) corresponding to primary display 620 to turn off primary display 620. Moreover, process 700 may involve processor 610 disconnecting the first virtual pipe from the first DSI. Also, process 700 may involve processor 610 changing from a second virtual pipe (e.g., CRTC1) being connected to a second DSI (e.g., DSI1) corresponding to secondary display 630 to the backup pipe being connected to the second DSI. Furthermore, process 700 may involve processor 610 powering on the backup pipe and the second DSI for secondary display 630.

In some implementations, in switching primary display 620 and secondary display 630 from the first state to the second state, process 700 may involve processor 610 performing certain operations in an N-channel design. For instance, process 700 may involve processor 610 preparing a backup pipe as a backup of a second virtual pipe (e.g., CRTC1) with a resolution of secondary display 630 and a new content. Also, process 700 may involve processor 610 powering off a first DSI (e.g., DSI0) corresponding to primary display 620 to turn off primary display 620. Additionally, process 700 may involve processor 610 disconnecting a first virtual pipe (e.g., CRTC0) from the first DSI. Moreover, process 700 may involve processor 610 changing from the second virtual pipe being connected to a second DSI (e.g., DSI1) corresponding to secondary display 630 to the backup pipe being connected to the second DSI. Furthermore, process 700 may involve processor 610 powering on the backup pipe and the second DSI for secondary display 630.

In some implementations, in maintaining the power supplied to secondary display 630, process 700 may involve processor 610 refraining from discontinuing or changing the power supplied to secondary display 630 despite a state change process to change from the first state to the second state according to a command from an OS involves cutting off the power supplied to secondary display 630. In some implementations, the command may include an AOSP command.

In some implementations, primary display 620 may have a larger display area, a higher display resolution, or both, compared to secondary display 630.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of a status change with respect to a multi-display apparatus having a primary display and a secondary display, comprising:
    maintaining a power supplied to the secondary display during the status change; and
    switching the primary display and the secondary display from a first state to a second state;
    wherein:
        in the first state, the primary display is off and the secondary display is on;
        in the second state, both the primary display and the secondary display are on; and
        the switching of the primary display and the secondary display from the first state to the second state comprises:
            preparing a backup pipe as a backup of a first virtual pipe with a resolution of the primary display;
            changing from the first virtual pipe being connected to a second display serial interface (DSI) corresponding to the secondary display to a second virtual pipe being connected to the second DSI;
            connecting the backup pipe to a first DSI corresponding to the primary display;
            connecting the second virtual pipe to the second DSI; and
            powering on the backup pipe and the first DSI to turn on the primary display,
        wherein each of the first virtual pipe and the second virtual pipe comprises respective hardware components configured to provide display processing, overlaying, and picture quality enhancement functionalities.

2. The method of claim 1, wherein the maintaining of the power supplied to the secondary display comprises refraining from discontinuing or changing the power supplied to the secondary display despite a state change process to change from the first state to the second state according to a command from an operating system (OS) involves cutting off the power supplied to the secondary display.

3. The method of claim 1, wherein the primary display has a larger display area, a higher display resolution, or both, compared to the secondary display.

4. A device implementable in a multi-display apparatus having a primary display and a secondary display, comprising:
    a processor configured to execute a status change with respect to the primary display and the secondary display by performing operations comprising:
        maintaining a power supplied to the secondary display during the status change; and
        switching the primary display and the secondary display from a first state to a second state;
        wherein:
            in the first state, the primary display is off and the secondary display is on;
            in the second state, both the primary display and the secondary display are on; and
            in switching the primary display and the secondary display from the first state to the second state, the processor is configured to perform operations comprising:
                preparing a backup pipe as a backup of a first virtual pipe with a resolution of the primary display;

changing from the first virtual pipe being connected to a second display serial interface (DSI) corresponding to the secondary display to a second virtual pipe being connected to the second DSI;
connecting the backup pipe to a first DSI corresponding to the primary display;
connecting the second virtual pipe to the second DSI; and
powering on the backup pipe and the first DSI to turn on the primary display,
wherein each of the first virtual pipe and the second virtual pipe comprises respective hardware components configured to provide display processing, overlaying, and picture quality enhancement functionalities.

5. The device of claim 4, wherein, in maintaining the power supplied to the secondary display, the processor is configured to refrain from discontinuing or changing the power supplied to the secondary display despite a state change process to change from the first state to the second state according to a command from an operating system (OS) involves cutting off the power supplied to the secondary display.

6. The device of claim 4, wherein the primary display has a larger display area, a higher display resolution, or both, compared to the secondary display.

7. A method of a status change with respect to a multi-display apparatus having a primary display and a secondary display, comprising:
maintaining a power supplied to the secondary display during the status change; and
switching the primary display and the secondary display from a first state to a second state;
wherein:
in the first state, the primary display is off and the secondary display is on;
in the second state, both the primary display and the secondary display are on;
the switching of the primary display and the secondary display from the first state to the second state comprises:
preparing a backup pipe as a backup of a second virtual pipe with a resolution of the secondary display and a new content;
changing from the second virtual pipe being connected to a second display serial interface (DSI) corresponding to the secondary display to the backup pipe being connected to the second DSI;
connecting a first virtual pipe to a first DSI corresponding to the primary display;
connecting the backup pipe to the second DSI; and
powering on the first virtual pipe and the first DSI to turn on the primary display,
wherein each of the first virtual pipe and the second virtual pipe comprises respective hardware components configured to provide display processing, overlaying, and picture quality enhancement functionalities.

8. The method of claim 7, wherein the maintaining of the power supplied to the secondary display comprises refraining from discontinuing or changing the power supplied to the secondary display despite a state change process to change from the first state to the second state according to a command from an operating system (OS) involves cutting off the power supplied to the secondary display.

9. The method of claim 7, wherein the primary display has a larger display area, a higher display resolution, or both, compared to the secondary display.

10. A device implementable in a multi-display apparatus having a primary display and a secondary display, comprising:
a processor configured to execute a status change with respect to the primary display and the secondary display by performing operations comprising:
maintaining a power supplied to the secondary display during the status change; and
switching the primary display and the secondary display from a first state to a second state;
wherein:
in the first state, the primary display is off and the secondary display is on;
in the second state, both the primary display and the secondary display are on; and
in switching the primary display and the secondary display from the first state to the second state, the processor is configured to perform operations comprising:
preparing a backup pipe as a backup of a second virtual pipe with a resolution of the secondary display and a new content;
changing from the second virtual pipe being connected to a second display serial interface (DSI) corresponding to the secondary display to the backup pipe being connected to the second DSI;
connecting a first virtual pipe to a first DSI corresponding to the primary display;
connecting the backup pipe to the second DSI; and
powering on the first virtual pipe and the first DSI to turn on the primary display,
wherein each of the first virtual pipe and the second virtual pipe comprises respective hardware components configured to provide display processing, overlaying, and picture quality enhancement functionalities.

11. The device of claim 10, wherein, in maintaining the power supplied to the secondary display, the processor is configured to refrain from discontinuing or changing the power supplied to the secondary display despite a state change process to change from the first state to the second state according to a command from an operating system (OS) involves cutting off the power supplied to the secondary display.

12. The device of claim 10, wherein the primary display has a larger display area, a higher display resolution, or both, compared to the secondary display.

13. A method of a status change with respect to a multi-display apparatus having a primary display and a secondary display, comprising:
maintaining a power supplied to the secondary display during the status change; and
switching the primary display and the secondary display from a first state to a second state;
wherein:
in the first state, both the primary display and the secondary display are on;
in the second state, the primary display is off and the secondary display is on; and
the switching of the primary display and the secondary display from the first state to the second state comprises:
preparing a backup pipe as a backup of a first virtual pipe with a resolution of the secondary display;

powering off a first display serial interface (DSI) corresponding to the primary display to turn off the primary display;

disconnecting the first virtual pipe from the first DSI;

changing from a second virtual pipe being connected to a second DSI corresponding to the secondary display to the backup pipe being connected to the second DSI; and powering on the backup pipe and the second DSI for the secondary display, wherein each of the first virtual pipe and the second virtual pipe comprises respective hardware components configured to provide display processing, overlaying, and picture quality enhancement functionalities.

14. The method of claim 13, wherein the maintaining of the power supplied to the secondary display comprises refraining from discontinuing or changing the power supplied to the secondary display despite a state change process to change from the first state to the second state according to a command from an operating system (OS) involves cutting off the power supplied to the secondary display.

15. The method of claim 13, wherein the primary display has a larger display area, a higher display resolution, or both, compared to the secondary display.

16. A device implementable in a multi-display apparatus having a primary display and a secondary display, comprising:

a processor configured to execute a status change with respect to the primary display and the secondary display by performing operations comprising:

maintaining a power supplied to the secondary display during the status change; and switching the primary display and the secondary display from a first state to a second state;

wherein:

in the first state, both the primary display and the secondary display are on;

in the second state, the primary display is off and the secondary display is on; and in switching the primary display and the secondary display from the first state to the second state, the processor is configured to perform operations comprising:

preparing a backup pipe as a backup of a first virtual pipe with a resolution of the secondary display;

powering off a first display serial interface (DSI) corresponding to the primary display to turn off the primary display;

disconnecting the first virtual pipe from the first DSI;

changing from a second virtual pipe being connected to a second DSI corresponding to the secondary display to the backup pipe being connected to the second DSI; and powering on the backup pipe and the second DSI for the secondary display, wherein each of the first virtual pipe and the second virtual pipe comprises respective hardware components configured to provide display processing, overlaying, and picture quality enhancement functionalities.

17. The device of claim 16, wherein, in maintaining the power supplied to the secondary display, the processor is configured to refrain from discontinuing or changing the power supplied to the secondary display despite a state change process to change from the first state to the second state according to a command from an operating system (OS) involves cutting off the power supplied to the secondary display.

18. The device of claim 16, wherein the primary display has a larger display area, a higher display resolution, or both, compared to the secondary display.

19. A method of a status change with respect to a multi-display apparatus having a primary display and a secondary display, comprising:

maintaining a power supplied to the secondary display during the status change; and switching the primary display and the secondary display from a first state to a second state;

wherein:

in the first state, both the primary display and the secondary display are on;

in the second state, the primary display is off and the secondary display is on; and the switching of the primary display and the secondary display from the first state to the second state comprises:

preparing a backup pipe as a backup of a second virtual pipe with a resolution of the secondary display and a new content;

powering off a first display serial interface (DSI) corresponding to the primary display to turn off the primary display;

disconnecting a first virtual pipe from the first DSI;

changing from the second virtual pipe being connected to a second DSI corresponding to the secondary display to the backup pipe being connected to the second DSI; and powering on the backup pipe and the second DSI for the secondary display, wherein each of the first virtual pipe and the second virtual pipe comprises respective hardware components configured to provide display processing, overlaying, and picture quality enhancement functionalities.

20. The method of claim 19, wherein the maintaining of the power supplied to the secondary display comprises refraining from discontinuing or changing the power supplied to the secondary display despite a state change process to change from the first state to the second state according to a command from an operating system (OS) involves cutting off the power supplied to the secondary display.

21. The method of claim 19, wherein the primary display has a larger display area, a higher display resolution, or both, compared to the secondary display.

22. A device implementable in a multi-display apparatus having a primary display and a secondary display, comprising:

a processor configured to execute a status change with respect to the primary display and the secondary display by performing operations comprising:

maintaining a power supplied to the secondary display during the status change; and switching the primary display and the secondary display from a first state to a second state;

wherein:

in the first state, both the primary display and the secondary display are on;

in the second state, the primary display is off and the secondary display is on; and in switching the primary display and the secondary display from the first state to the second state, the processor is configured to perform operations comprising:

preparing a backup pipe as a backup of a second virtual pipe with a resolution of the secondary display and a new content;

powering off a first display serial interface (DSI) corresponding to the primary display to turn off the primary display;

disconnecting a first virtual pipe from the first DSI;

changing from the second virtual pipe being connected to a second DSI corresponding to the secondary display to the backup pipe being connected to the second DSI; and powering on the backup pipe and the second DSI for the secondary display, wherein each of the first virtual pipe and the second virtual pipe comprises respective hardware components configured to provide display processing, overlaying, and picture quality enhancement functionalities.

23. The device of claim 22, wherein, in maintaining the power supplied to the secondary display, the processor is configured to refrain from discontinuing or changing the power supplied to the secondary display despite a state change process to change from the first state to the second state according to a command from an operating system (OS) involves cutting off the power supplied to the secondary display.

24. The device of claim 22, wherein the primary display has a larger display area, a higher display resolution, or both, compared to the secondary display.

* * * * *